United States Patent [19]

Ballheimer

[11] 4,345,797
[45] Aug. 24, 1982

[54] LUBRICATION SYSTEM FOR AN ENGINE

[75] Inventor: Benny Ballheimer, Peoria, Ill.

[73] Assignee: Caterpillar Tractor Co., Peoria, Ill.

[21] Appl. No.: 117,715

[22] Filed: Feb. 1, 1980

Related U.S. Application Data

[63] Continuation-in-part of Ser. No. 965,532, Nov. 20, 1978, abandoned.

[51] Int. Cl.³ ............................. F16C 3/14; F16C 9/04
[52] U.S. Cl. .................................... 308/122; 308/240; 184/6.5
[58] Field of Search ................... 308/23, 78, 122, 240; 74/579 E, 580, 605; 123/196 R; 184/6.5, 6.8

[56] References Cited

U.S. PATENT DOCUMENTS

| | | | |
|---|---|---|---|
| 2,131,170 | 9/1938 | Evans | 308/122 |
| 2,199,699 | 5/1940 | Frelin | 184/6.5 |
| 2,916,333 | 12/1959 | Johnson | 308/122 |
| 2,940,802 | 6/1960 | Love | 308/240 |
| 3,069,926 | 12/1962 | Hoffman et al. | 184/6.5 |
| 3,495,685 | 2/1970 | Van Rinsom | 308/78 |
| 3,625,580 | 12/1971 | DeHart et al. | 308/240 |
| 4,201,176 | 5/1980 | Lustgarten | 308/240 |

FOREIGN PATENT DOCUMENTS

| | | | |
|---|---|---|---|
| 1266062 | 4/1968 | Fed. Rep. of Germany | 308/122 |
| 2631376 | 8/1977 | Fed. Rep. of Germany | 308/23 |
| 2647441 | 4/1978 | Fed. Rep. of Germany | |
| 2657467 | 6/1978 | Fed. Rep. of Germany | 123/196 R |
| 45-26325 | 8/1970 | Japan | 184/6.5 |
| 1153429 | 5/1969 | United Kingdom | 308/122 |

*Primary Examiner*—Richard R. Stearns
*Attorney, Agent, or Firm*—William B. Heming

[57] ABSTRACT

An engine (10) has a journal (18), a connecting rod (14) and a bearing (16) positioned between the journal (18) and rod (14). A lubrication system (36) for the engine (10) has a first passage (38) in the journal (18) and second and third passages (40,42) disposed between the journal (18) and bearing (16). The first passage (38) is positionable in fluid communication with the second and third passages (40,42) in response to rotation of the journal (18) for supplying lubricant therethrough to the bearing (16), journal (18) and piston areas. The first passage (38) is in continuous fluid communication with at least one of the second and third passages (40,42) to supply an uninterrupted flow of lubricant for maximum lubrication and cooling of the bearing (16), journal (18) and piston areas of the engine (10). The second and third passages (40,42) are positioned at preselected angles (A₄, A₇; A₅, A₆) from principal loading areas (26,28) of the bearing (16) to maximize bearing area for carrying the loads exerted through the connecting rod (14).

2 Claims, 4 Drawing Figures

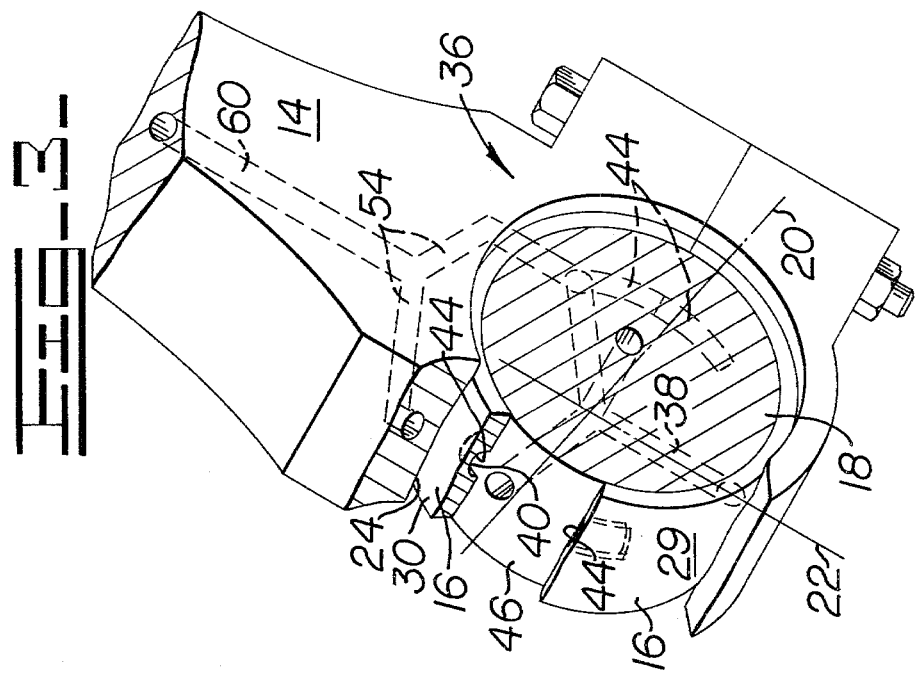
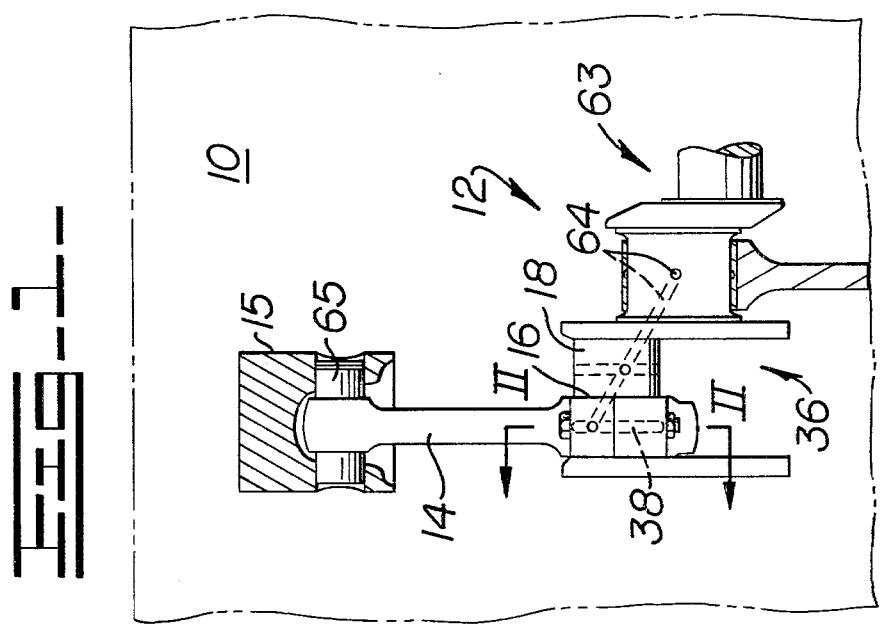

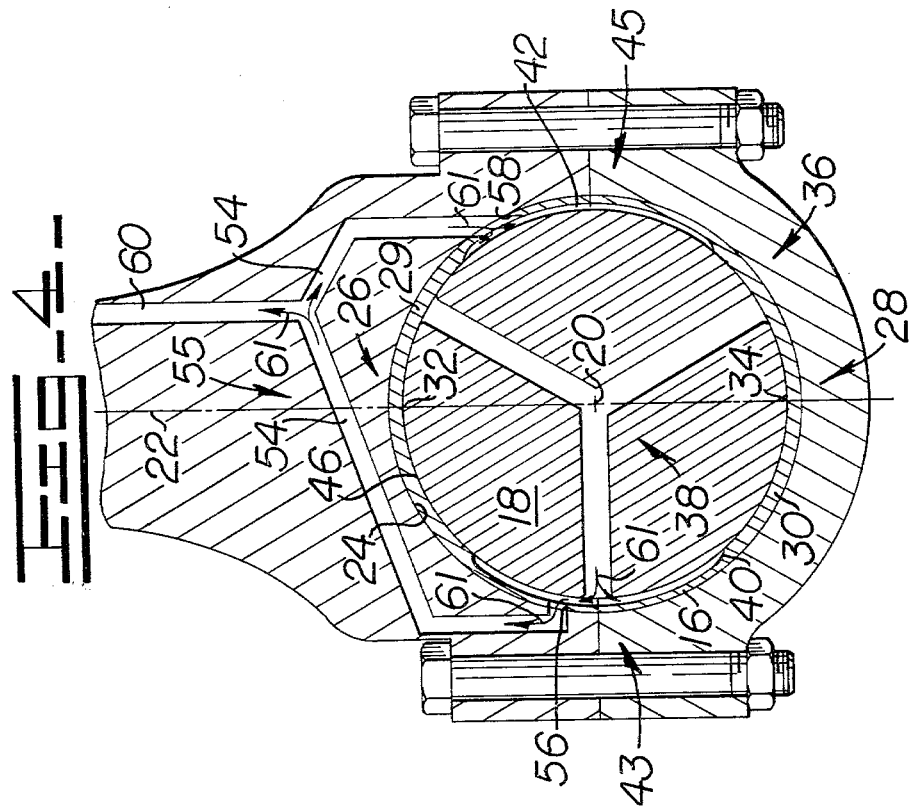
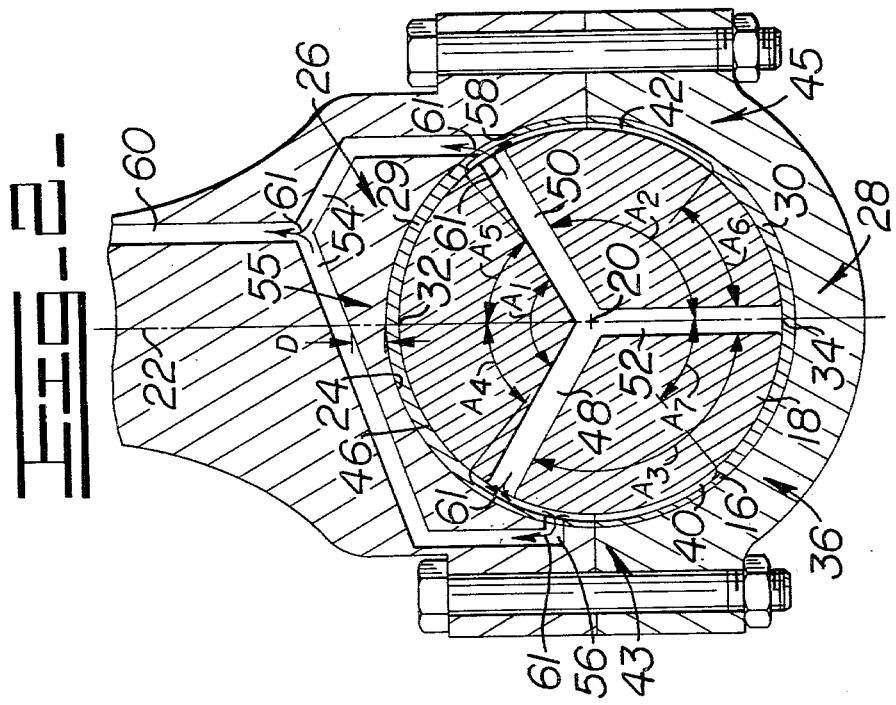

LUBRICATION SYSTEM FOR AN ENGINE

CROSS-REFERENCE TO RELATED APPLICATIONS

This application is a Continuation-in-Part of application Ser. No. 965,532 filed by B. Ballheimer on Nov. 20, 1978, and now abandoned.

DESCRIPTION

TECHNICAL FIELD

The invention relates to an engine lubricating system utilizing passages in a crankshaft journal and disposed between the journal and a bearing interposed between a connecting rod and said journal. More particularly, the invention relates to the passages disposed between the journal and bearing being spaced from the principal loading areas of the bearing and being in continuous fluid communication with the passages in the crankshaft journal.

BACKGROUND ART

In the use of a lubricating system for an engine, it is desirable to maintain an uninterrupted flow of lubricant to the piston crown, connecting rod bearings and adjacent crankshaft journals and to maximize surface areas of the bearing and connecting rod in the areas of principal loading of the bearing.

U.S. Pat. No. 3,069,926 which issued to Hoffman et al on Dec. 25, 1962, shows a passage in a crankshaft and first and second notch defined openings or passages in a bearing. A groove in a principal loading area of the bearing is positionable in fluid communication with the journal passage through the notches to receive fluid for lubricating the bearing. U.S. Pat. No. 2,131,170 which issued to Evans on Sept. 27, 1938, shows a similar engine lubrication system. U.S. Pat. No. 2,199,699, which issued to Frelin on May 7, 1940, shows yet another such lubrication system which provides continuous flow to the bearing through two passages in the journal which are oriented at right angles one to the other.

U.S. Pat. No. 2,916,333 which issued to Johnson on Dec. 8, 1959, discloses a journal passage positionable in fluid communication with first and second passages defined by a bearing and the journal only at intervals during rotation of the journal. U.S. Pat. No. 2,940,802 which issued to Love on June 14, 1960, U.S. Pat. No. 3,495,685 which issued to Rivaum on Feb. 17, 1970, and U.S. Pat. No. 3,625,580 which issued to DeHart on Dec. 7, 1971, disclose similar embodiments of engine lubrication systems.

In an engine, a connecting rod is connected to a rotatable crankshaft journal and a bearing connected to the connecting rod is positioned between said rod and the journal. A lubricating film is provided between the interacting bearing and journal to provide a lubricated cushion for the connecting rod and to prevent failure of the bearing. Piston crown areas and pins connecting the pistons to the connecting rod are also lubricated through connecting rod passages to increase engine durability. Lubricant for such purposes is commonly supplied through a passage in the crankshaft journal to passages defined by the bearing and journal. Said crankshaft journal passage is positionable in fluid communication with the bearing and journal defined passages in response to rotation of the crankshaft journal. In this manner, lubricant is supplied from the journal passage to the bearing and journal defined passages for lubrication of the engine, as mentioned above.

Heretofore, establishing continuous flow of lubricant from the journal passage to the bearing and journal defined passages was commonly accomplished through the use of such bearing and journal defined passages positioned in principal loading areas of the bearing. This provided continuous fluid communication between the journal passages and bearing and journal defined passages. However, the resultant reduction of surface area in the bearing and/or adjacent surface of the connecting rod reduces load carrying capacity of the bearings. This can sometimes result in early failure of the bearing and shut-off of lubrication to the piston.

In removing the passages from the principal loading areas of the bearing, the journal passage has been most commonly positionable in fluid communication with the bearing and journal defined passages only during intervals in the rotation of the crankshaft journal. The result is an intermittent flow of lubricant from the journal passage to the engine, reducing the lubricating and cooling efficiency of the lubricating system. Where the passages are in continuous fluid communication with the journal passages, such passages encroach into less, but still highly loaded, portions of the bearing. Thus, bearing surface is not maximized in order to carry the tremendous loads encountered in the engine.

The present invention is directed to overcoming one of more of the problems set forth above.

DISCLOSURE OF INVENTION

In one aspect of the present invention, a lubrication system for an engine has first, second and third passages. The engine has a crankshaft journal, a connecting rod connected to the journal and a bearing having first and second loading areas and being positioned between the journal and connecting rod. Said first and second loading areas are positioned at locations sufficient for receiving principal loads in response to movement of the connecting rod. The first passage of the lubrication system is in the crankshaft journal. The second and third passages are defined by the bearing and spaced from the first and second loading areas of the bearing. The first passage is positionable in fluid communication with the second and third passages in response to rotation of the journal. Said first passage is oriented sufficient for being in continuous fluid communication with at least one of said second and third passages in response to rotation of the crankshaft journal. The second and third passages are each spaced at preselected angles from the loading areas of the bearing.

The lubrication system provides a flow of lubricant under pressure to the bearing and crankshaft journal and to the piston associated with the connecting rod for cooling and lubricating said areas of the engine. Passages in the loading areas of the bearing can affect durability of the engine owing to reduction of surface area in the bearing and/or adjacent portions of the connecting rod. An intermittent flow of lubricant can also reduce engine durability owing to higher engine operating temperature. In the lubrication system, the second and third passages are spaced at preselected angles from the loading areas of the bearing for maximum bearing surface in said areas. The first passage is in continuous fluid communication with said second and third passages for providing a continuous supply of lubricant to the engine.

BRIEF DESCRIPTION OF DRAWINGS

FIG. 1 is a side elevational view with portions in section showing an engine crankshaft journal incorporating an embodiment of the present invention;

FIG. 2 is a cross-sectional view taken along line II—II of FIG. 1;

FIG. 3 is a somewhat enlarged three dimensional view of the crankshaft journal of FIG. 1 with portions broken away; and FIG. 4 is a cross-sectional view also taken along line II—II of FIG. 1 and showing the components of the invention in a different position from FIG. 2.

BEST MODE FOR CARRYING OUT THE INVENTION

Referring particularly to FIG. 1, an engine 10 has a rotatable crankshaft 12, a connecting rod 14, piston 15 and a bearing 16. Referring also to the other drawings, the crankshaft 12 has a crankshaft journal 18 having a central axis 20 and a normal axis 22 which corresponds to the longitudinal axis of the connecting rod 14 at its top dead center (FIGS. 2 and 4) and bottom dead center positions. The connecting rod 14 has a bearing surface 24 and is connected to the journal 18. Said bearing surface 24 is in contact with the bearing 16. The bearing 16 has first and second loading areas 26,28 and is positioned between the journal 18 and the connecting rod 14. Said bearing 16 is shown having first and second bearing halves 29,30. The first and second loading areas 29,28 represent those portions of the bearing 16 positioned for receiving principal work loads which are primarily oriented along the normal axis 22 and produced in response to movement of the connecting rod 14 as the engine is operated. The loading areas 26,28 are positioned substantially opposite one from the other and generally about the intersection of the normal axis 22 and the bearing 16. Said normal axis 22 of the journal 18 intersects the central axis 20 of the journal 18 and also intersects the first and second loading areas 26,28 at first and second points of intersection 32,34. Such engine construction is well known in the art.

As is best seen in FIGS. 2 and 4, a lubrication system 36 for the engine 10 has first, second and third passages 38,40,42. The first passage 38 is in the crankshaft journal 18. The second and third passages 40,42 are disposed between the bearing 16 and the journal 18. In the preferred embodiment, the bearing halves 29,30 each have grooves 44. The grooves 44 and a surface 46 of the crankshaft journal 18 contacting said bearing 16 define the second and third passages 40,42 (FIG. 3), as is common practice in the engine art. The first passage 38 is positionable in fluid communication with the second and third passages 40,42 in response to rotation of the crankshaft journal 18. In the lubrication system 36 of the present invention, the first passage 38 is in continuous and preferably direct fluid communication with at least one of said second and third passages 40,42 in response to rotation of the journal 18.

The second and third passages 40,42 are positioned radially from and on substantially opposite sides 43,45 of the central axis 20 of the crankshaft journal 18. Said passages 40,42 are spaced from the first and second loading areas 26,28 of the bearing 16 at preselected angles $A_4$, $A_7$; $A_5$, $A_6$ relative to said central axis 20 from the points of intersection 32,34 of the normal axis 22 and the bearing 16 (FIG. 2). The magnitude of said preselected angles $A_4$, $A_5$, $A_6$, $A_7$ is discussed hereinafter.

The first passage 38 preferably has first, second and third passage portions 48,50,52 each positionable in fluid communication with the second and third passages 40,42 in response to rotation of the crankshaft journal 18. Said passage portions 48,50,52 are positioned at preselected angles $A_1$, $A_2$, $A_3$, one from the other (FIG. 2).

The magnitudes of the angles $A_1$, $A_2$, $A_3$ associated with the passage portions 48,50,52 and of the angles $A_4$, $A_5$, $A_6$, $A_7$ associated with the second and third passages 40,42 are co-dependent upon continuous, direct fluid communication of the first passage 38 with at least one of the second and third passages 40,42 during rotation of the journal 18. The magnitudes of the angles $A_4$, $A_5$, $A_6$, $A_7$ associated with the second and third passages 40,42 are also dependent upon said passages 40,42 being spaced sufficiently distant from the loading areas 26,28 of the bearing 16 so as not to reduce bearing surface area at those locations. Said preselected angles $A_4$, $A_5$, $A_6$, $A_7$, are of a magnitude in a range from about 45° to about 60°. The passage portions 48,50,52 each extend outwardly from about the central axis 20 of the crankshaft journal 18 and are angularly positioned about 120° one from the other for cooperative operation with the second and third passages 40,42. That is, the angles $A_1$, $A_2$, $A_3$ associated with the passage portions 48,50,52 each have a magnitude of about 120°.

The lubricating system 36 includes a fourth passage 54 connecting the second and third passages 40,42 in fluid communication one with the other. Said fourth passage 54 is spaced from portions 55 of the bearing surface 24 of the connecting rod 14 adjacent the first and second loading areas 26,28 of the bearing 16. As is shown, the fourth passage 54 is positioned in the connecting rod 14 and spaced a distance D from the bearing surface 24 at the first principal loading area 26 of the bearing 16 (FIG. 2). Said distance D is dependent upon satisfactorily maintaining structural strength in a corresponding area of principal loading of the connecting rod 14.

The fourth passage 54 is in fluid communication with the second and third passages 40,42 through first and second openings 56,58 in the bearing 16, respectively. Said fourth passage 54 connects to a fifth passage 60 through which oil passes to cool and lubricate the piston 15, as is well known in the art. In some embodiments, separate passages connecting the respective second and third passages 40,42 to the piston 15 can also be used. Said passages can be formed in the connecting rod 14 or can be tubes connected to said rod 14.

It should be understood that the first, second, third and fourth passages 38,40,42,54 can be of other configurations as is known in the art without departing from the invention.

INDUSTRIAL APPLICABILITY

In the use of the lubricating system 36, lubricant is supplied under pressure to the first passage 38 by one supply means 63 generally including additional passages 64 in the crankshaft 12, as is well known in the art (FIG. 1). The passage portions 48,50,52 of the first passage 38 move into fluid communication with the second and third passages 40,42 as the crankshaft journal 18 rotates relative to the bearing 16. During fluid communication of the first passage 38 with the second and third passages 40,42, the lubricant passes through said second and third passages 40,42 to form a lubrication film on the bearing 16 and surface 18 of the journal and through the fourth and fifth passages 54,60 to the piston 15.

For example, in the operation of the engine 10, the crankshaft 12 rotates in response to forces exerted through the connecting rod 14 on the crankshaft 12 by the piston 15. The forces exerted create loads on the bearing 16 and adjacent portions of the respective surfaces 24,46 of the connecting rod 14 and journal 18. Principal loading at the top dead center position of FIGS. 2 and 4 occurs adjacent the intersection of the normal axis 22 of the connecting rod 14 with said respective adjacent surfaces 24,46 and the bearing 16. In other positions of the connecting rod 14 relative to the normal axis 22, the first and second loading areas 26,28 also generally indicate the location of principal loading on the bearing 16. The second and third passages 40,42 are spaced from such locations of principal loading. Thus, said passages 40,42 do not reduce bearing surface area or structural integrity at such locations.

Each of the passage portions 48,50,52 of the first passage 38 is in turn positioned in direct fluid communication with the second and third passages 40,42 owing to rotation of the crankshaft journal 18. As is evident from a study of the drawings, at least one of said passage portions 48,50,52 is in direct fluid communication with one of said second and third passages 40,42 at any point during rotation of the crankshaft journal 18. In this manner, the first passage 38 is in continuous, direct fluid communication with at least one of said second and third passages 40,42 for providing an uninterrupted flow of lubricant from the first passage 38.

For example, FIGS. 2 and 4 show relative positions and orientations of the passage portions 48,50,52 of the first passage 38 and the second and third passages 40,42. In FIG. 2, the first and second passage portions 48,50 are in direct fluid communication with the second and third passages 40,42, respectively. Flow lines 61 indicate the flow of lubricant into the second and third passages 40,42. Lubricant is blocked from leaving the third passage portion 52 owing to the relative positions of the bearing 16 and said passage portion 52. In FIG. 4, lubricant passes from the third passage portion 52 into the second passage 42 and is blocked from leaving the first and second passage portions 48,50. The flow lines 61 also indicate the flow of the lubricant in FIG. 4.

Lubricant passed into the second and third passages 40,42 provides a film between the bearing 16 and crankshaft journal 18 for lubricating and cooling the bearing 16 and journal 18 during operation of the engine 10. The grooves 44 in the bearings 16 have generally tapered end portions, as is known in the art, to facilitate formation of the lubricant film. Lubricant passed into said passages 40,42 also is directed to the piston 15 for lubrication and cooling of the crown area of the piston 15 and a pin 65 connecting said piston 15 to the connecting rod 14.

The flow lines 61 indicate the flow of lubricant from the second and third passages 40,42 toward the piston 15. In FIG. 2, lubricant flows from the second passage 40 through fourth passage 54 into the fifth passage 60. From the third passage 42, lubricant also flows through the fourth passage 54 into the fifth passage 60. In FIG. 4, lubricant flows from the second passage 40 through the fourth passage 54 into both the third and fifth passages 42,60. Therefore, flow of the lubricant is continuous to the piston 15 and also to the bearing 16 and journal 18 at the third passage 40 even though the first passage 38 is in direct fluid communication with only the second passage 40.

The magnitude of the flow of lubricant to the piston 15 and to the bearing 16 and journal 18 is dependent upon the cross-sectional area of the grooves 44 forming the second and third passages. A smaller cross-sectional area tends to increase flow to the piston 15 and lessen the amount of lubricant passing from said groove 44 and between the bearing 16 and journal 18. A larger cross-sectional area favors the formation of a film of lubricant between the bearing 16 and journal 18.

In the above mentioned manner, therefore, the first passage 38 is in direct, continuous fluid communication with at least one of the second and third passages 40,42 to provide an uninterrupted flow of lubricant for lubricating and cooling the piston 15 and the interacting bearing 16 and journal 18. The second and third passages 40,42 are suitably spaced at the preselected angles $A_4, A_5, A_6, A_7$ to maximize bearing surface, particularly in the principal loading areas 26,28 of the bearing 16.

In the embodiment shown, said angles $A_4, A_5, A_6, A_7$, each have a magnitude of about 45°. It will be appreciated from a study of the drawings, however, that the orientation of the first, second and third passage portions 48,50,52 relative one to the other allows the preselected angles $A_4, A_5, A_6, A_7$ to be of magnitudes from greater than about 45° to less than about 60°. Positioning of the portions 48,50,52 at angles $A_4, A_5, A_6, A_7$ with magnitudes of about 60°, for example, will reduce the "length" of the second and third passages 40,42 along the periphery of the journal 18 to about the location of the ends of the first and second passage portions 48,50 in FIG. 2. Such larger angles significantly increase total bearing area to better carry loads directed onto the bearing. Acceptable values of the angles $A_4, A_5, A_6, A_7$, particularly of the magnitudes about 60°, will depend upon the size or cross sectional width of the passage portions 48,50,52 and the amount of "shut-off" of oil acceptable when the passage portions are positioned as in FIG. 2 relative to 60° preselected angles $A_4, A_5$ and the entire cross-sectional widths of the communicating passage portions do not open into the second and third passages 40,42.

Other aspects, objects and advantages will become apparent from a study of the specification, drawings and appended claims.

I claim:

1. In a lubrication system (36) for an engine (10) having a crankshaft journal (18) having a central axis (20) and a normal axis (22), a connecting rod (14) connected to said journal (18) and a bearing (16) having first and second substantially opposed loading areas (26,28) and being positioned between the journal (18) and connecting rod (14), said first and second loading areas (26,28) being positioned at locations sufficient for receiving principal loads in response to movement of said connecting rod (14), said normal axis (22) intersecting said first and second loading areas (26,28) and said central axis (20), said lubrication system (36) having a first passage (38) in the journal (18) and second and third passages (40,42) disposed between the bearing (16) and said journal (18), said first passage (38) being positionable in fluid communication with said second and third passages (40,42) in response to rotation of said journal (18), the improvement comprising:

said first passage (38) having first, second and third passage portions (48,50,52) positioned at preselected angles ($A_1, A_2, A_3$) one from the other and being in continuous fluid communication through said passage portions (48,50,52) with at least one of said second and third passages (40,42) in response to rotation of the crankshaft journal (18), said preselected angles ($A_1, A_2, A_3$) each being about 120°; and said second and third passages (40,42) each being spaced at preselected angles ($A_4, A_7, A_5, A_6$) relative to said central axis (20) from said points of intersection (32,34) of said normal axis (22) and said first and second loading areas (26,28), said preselected angles ($A_4, A_5, A_6, A_7$) each having a magnitude greater than 45° and less than about 60°.

2. The lubrication system, as set forth in claim 1, wherein the connecting rod (14) has a bearing surface (24) in contact with the bearing (16) and including a fourth passage (54) positioned in said rod (14), connecting the second and third passages (40,42) in fluid communication and being spaced from portions (55) of said bearing surface (24) adjacent the first and second loading areas (26,28) of the bearing (16).

* * * * *